US009488990B2

(12) United States Patent
Morikawa et al.

(10) Patent No.: US 9,488,990 B2
(45) Date of Patent: Nov. 8, 2016

(54) SOLENOID VALVE SYSTEM

(71) Applicant: SMC KABUSHIKI KAISHA, Chiyoda-ku (JP)

(72) Inventors: Fumio Morikawa, Misato-shi (JP); Naoki Sakamura, Nagareyama-shi (JP)

(73) Assignee: SMC KABUSHIKI KAISHA, Chiyoda-ku (JP)

( * ) Notice: Subject to any disclaimer, the term of this patent is extended or adjusted under 35 U.S.C. 154(b) by 136 days.

(21) Appl. No.: 14/394,371

(22) PCT Filed: Apr. 26, 2013

(86) PCT No.: PCT/JP2013/062874
§ 371 (c)(1),
(2) Date: Oct. 14, 2014

(87) PCT Pub. No.: WO2013/168723
PCT Pub. Date: Nov. 14, 2013

(65) Prior Publication Data
US 2015/0083260 A1 Mar. 26, 2015

(30) Foreign Application Priority Data

May 9, 2012 (JP) ................. 2012-107346
Apr. 4, 2013 (JP) ................. 2013-078525

(51) Int. Cl.
F16K 11/10 (2006.01)
G05D 16/20 (2006.01)
(Continued)

(52) U.S. Cl.
CPC ....... G05D 16/2026 (2013.01); F15B 13/0817 (2013.01); F15B 20/008 (2013.01); F15B 13/085 (2013.01); F15B 13/086 (2013.01); F15B 13/0867 (2013.01); F15B 2211/7142 (2013.01); F15B 2211/8636 (2013.01);
(Continued)

(58) Field of Classification Search
USPC ......................................... 137/884
See application file for complete search history.

(56) References Cited

U.S. PATENT DOCUMENTS 5,519,636 A * 5/1996 Stoll ............. F15B 13/0814
340/4.36
7,690,398 B2 * 4/2010 Kuhbauch ......... F15B 13/0817
137/560
8,156,965 B2 * 4/2012 Kremser ............ G05B 9/02
137/560

(Continued)

FOREIGN PATENT DOCUMENTS

EP  1 041 325  10/2000
EP  1 594 024  7/2008

(Continued)

OTHER PUBLICATIONS

Office Action issued Nov. 18, 2014 in Japanese Patent Application No. 2013-078525 (with partial English language translation).

(Continued)

Primary Examiner — John Fox
(74) Attorney, Agent, or Firm — Oblon, McClelland, Maier & Neustadt, L.L.P.

(57) ABSTRACT

In a solenoid valve system, a plurality of first through third solenoid valve units are divided into a plurality of first through third groups. In this case, a safety power source control unit is provided for controlling the first through third solenoid valve units with respect to each of the first through third groups.

14 Claims, 7 Drawing Sheets

(51) Int. Cl.
*F15B 13/08* (2006.01)
*F15B 20/00* (2006.01)

(52) U.S. Cl.
CPC ... *F15B 2211/87* (2013.01); *F15B 2211/8752* (2013.01); *Y10T 137/87772* (2015.04)

(56) References Cited

U.S. PATENT DOCUMENTS

| | | | |
|---|---|---|---|
| 9,004,108 B2 * | 4/2015 | Okamoto | H01F 7/064 |
| | | | 137/884 |
| 2005/0274419 A1 | 12/2005 | Hjorth et al. | |
| 2009/0045363 A1 | 2/2009 | Kremser et al. | |

FOREIGN PATENT DOCUMENTS

| | | |
|---|---|---|
| EP | 2 026 156 | 9/2009 |
| JP | 49-19290 A | 5/1974 |
| JP | 2003 139264 | 5/2003 |

OTHER PUBLICATIONS

Written Opinion of the International Searching Authority Issued Jul. 29, 2013 in PCT/JP13/062874 Filed Apr. 26, 2013.
International Search Report Issued Jul. 29, 2013 in PCT/JP13/062874 Filed Apr. 26, 2013.

* cited by examiner

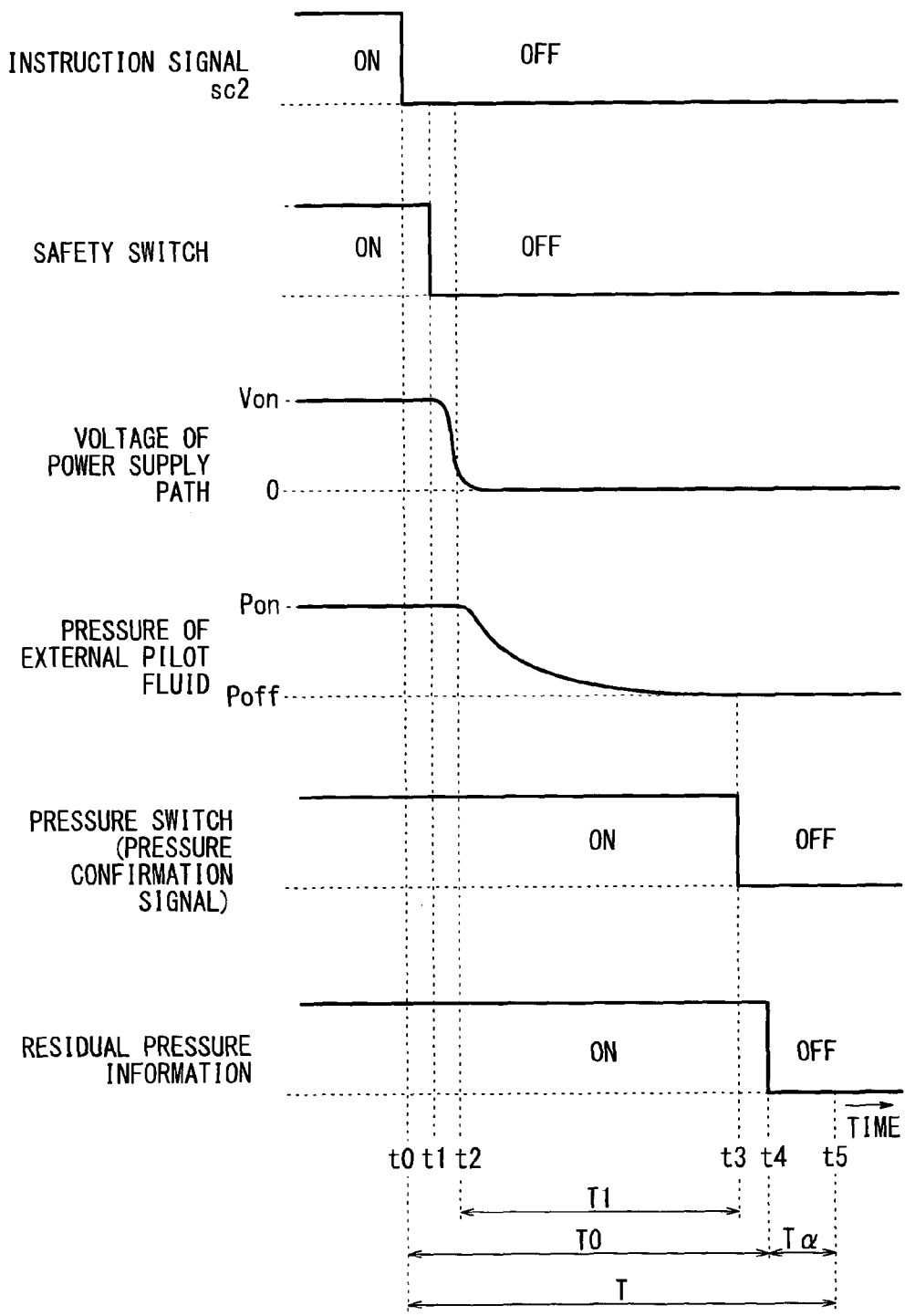

SOLENOID VALVE SYSTEM

TECHNICAL FIELD

The present invention relates to a solenoid valve system equipped with a safety function for a plurality of solenoid valve units provided in the form of a manifold.

BACKGROUND ART

Heretofore, a solenoid valve system has been known in which plural solenoid valve units are connected to make up a manifold, the system further comprising a safety apparatus or a safety countermeasure for the purpose of avoiding abnormalities or malfunctioning of solenoid valves in each of the solenoid valve units.

In such a solenoid valve system, for example, in a serial transmission unit that outputs control signals to the solenoid valve units, or in a circuit that outputs control signals to adjacent solenoid valve units among a plurality of solenoid valve units, malfunctioning due to failures or the like is known to occur. In this case, as a safety apparatus or a safety countermeasure, it is necessary for a condition to occur in which a solenoid valve unit cannot be controlled, even though a control signal is input to a solenoid valve of the solenoid valve unit exhibiting such an abnormality.

Thus, as disclosed in Japanese Laid-Open Patent Publication No. 2003-139264, the present applicant has proposed a solenoid valve control apparatus equipped with an interlock unit located between a serial transmission unit, which outputs control signals respectively to a plurality of solenoid valve units, and which carries out an interlock control with respect to all of the solenoid valve units. In this case, as a result of the interlock unit subjecting common signals, which are output to the solenoid valve units from the serial transmission unit, to such an interlock control, the interlock control is performed comprehensively with respect to the solenoid valve control apparatus as a whole.

Further, in the specification of European Patent No. EP 2026156 B1, a safety module is disclosed having a switching means for a power source supply line, such that, in a condition in which the switching means is actuated, a valve module power source supply line, by which power is supplied via the safety module, is interrupted.

SUMMARY OF INVENTION

However, in the structure according to the specification of European Patent No. EP 2026156 B1, the switching means interrupts the power source supply line to all of the valve modules. For this reason, supply of power is suspended even with respect to other solenoid valve units, which are not related to the solenoid valve in which an abnormality is exhibited. Consequently, with the structure according to European Patent No. EP 2026156 B1, the safety apparatus or safety countermeasure is inadequate.

The present invention has been conceived of taking into consideration the aforementioned problems. The present invention has an object of providing a solenoid valve system, in which, in a plurality of solenoid valves made up as a manifold, safety can be enhanced by suspending operation reliably and effectively only with respect to solenoid valves that should not be operated.

To achieve the foregoing object, the present invention is characterized by a solenoid valve system having a plurality of solenoid valve units provided in the form of a manifold, the solenoid valve units being controlled respectively by control signals, wherein the plurality of solenoid valve units are divided into a plurality of groups, the solenoid valve further includes a control unit for directly controlling solenoid valves in the plurality of solenoid valve units with respect to each of the plurality of groups, regardless of the control signals, and wherein, in a condition in which the control signals are input to the solenoid valve units, the control unit switches between an operable state in which the solenoid valve units are capable of being controlled, and an inoperable state in which the solenoid valve units cannot be operated.

According to the present invention, the plural solenoid valve units, which have been divided into plural groups, are controlled per each group by the control unit. By means of such a control, solenoid valves in the solenoid valve units are switched between an operable state in which the solenoid valves are capable of being controlled responsive to control signals, and an inoperable state in which the solenoid valves cannot be operated regardless of the control signals.

In this manner, by the control unit controlling the solenoid valve units per each group, the solenoid valves with respect to a group having a solenoid valve that should not be operated can be controlled to not operate, while solenoid valves with respect to the other groups can be controlled so as to be capable of operation. Further, the control unit can switch the solenoid valve units to an inoperable state incapable of being controlled regardless of the control signal. Owing thereto, even in the case of a failure of the device that outputs the control signal, or circuits related to the control signal in the solenoid valve units or the solenoid valves, solenoid valves that should not be operated can be stopped from operating reliably and effectively. Accordingly, the safety of a plurality of solenoid valve units that make up a manifold can be enhanced.

Further, the control unit may comprise a solenoid valve control unit for outputting the control signals to the solenoid valve units to thereby control the solenoid valve units, and a power source control unit for switching between the operable state and the inoperable state of the solenoid valve units.

The solenoid valve system may further comprise a power source for supplying electric power to the plurality of solenoid valve units, and a plurality of power supply paths connecting the plurality of solenoid valve units and the power source with respect to each of the plurality of groups. In this case, the power source control unit controls a power supply state in which power is supplied from the power source to the plurality of power supply paths, with respect to each of the plurality of groups.

The solenoid valve system may further comprise switching means for connecting the plurality of power supply paths and the power source, wherein, responsive to a control of the power source control unit, the switching means switches the power supply state in which power is supplied to the power supply paths.

In this case, the power source control unit may be disposed between the power source and the solenoid valve units, and the switching means may be provided in the power source control unit. Also, the switching means may be provided in each of the plurality of groups.

Furthermore, each of the groups may comprise at least two of the solenoid valve units. One of the solenoid valve units may include a first valve, an operational state of which is switched responsive to a control of the control unit, and another of the solenoid valve units may include a second valve, an operational state of which is switched responsive to a supply state of fluid supplied under a switching action of the first valve.

Further, each of the groups may comprise a supply state detecting unit for detecting the supply state of fluid that is supplied to the second valve.

In this case, the supply state detecting unit may comprise a pressure sensor for detecting a pressure of the fluid, or a pressure switch for outputting an output signal when the pressure of the fluid is lowered to a predetermined pressure.

The solenoid valve system may further comprise a supply state determining unit that determines whether or not the fluid from the first valve is being supplied appropriately to the second valve, based on the supply state of the fluid detected by the supply state detecting unit.

In addition, the control unit may control the solenoid valve units based on supply of an instruction signal, which instructs operation of the solenoid valve units, and the supply state determining unit may determine whether or not an instruction content of the instruction signal and the supply state of the fluid are consistent.

Further, the supply state determining unit may be provided in the control unit, or may be provided in an external control device capable of supplying the instruction signal. In this case, the instruction signal is supplied from the external control device to the control unit, or the instruction signal is supplied from the supply state determining unit to the control unit.

Furthermore, in the case that the supply state detecting unit is the pressure switch, the supply state determining unit may determine that the solenoid valve units are operating abnormally when the output signal is not supplied from the pressure switch to the supply state determining unit, even though a predetermined threshold time period has elapsed from supply of the instruction signal.

Moreover, the threshold time period may be an adjustable time, which is longer than a time period required from supply of the instruction signal until supply of the output signal to the supply state determining unit in the case that the solenoid valve units are operating normally. Owing to this, the threshold time period can be set to an arbitrary value.

As described above, according to the present invention, the following advantages are obtained.

More specifically, with the solenoid valve system, plural solenoid valve units are divided into a plurality of groups, and a control unit that controls the solenoid valve units with respect to each of the groups is provided. As a result, the operational state of solenoid valves in the solenoid valve units can be controlled per each of the groups. Thus, solenoid valves with respect to a group having a solenoid valve that should not be operated can be controlled to not operate, while solenoid valves with respect to the other groups can be controlled so as to be capable of operation. As a result, in a plurality of solenoid valve units provided in the form of a manifold, solenoid valves that should not be operated can be stopped from operating reliably and effectively, whereby safety can be enhanced.

The above and other objects features and advantages of the present invention will become more apparent from the following description when taken in conjunction with the accompanying drawings in which preferred embodiments of the present invention are shown by way of illustrative example.

BRIEF DESCRIPTION OF DRAWINGS

FIG. 7 is a timing chart showing states of respective components, from supply of an instruction signal from an external control device to a control unit, and until input of residual pressure information to the external control device.

DESCRIPTION OF EMBODIMENTS

Figure 1:
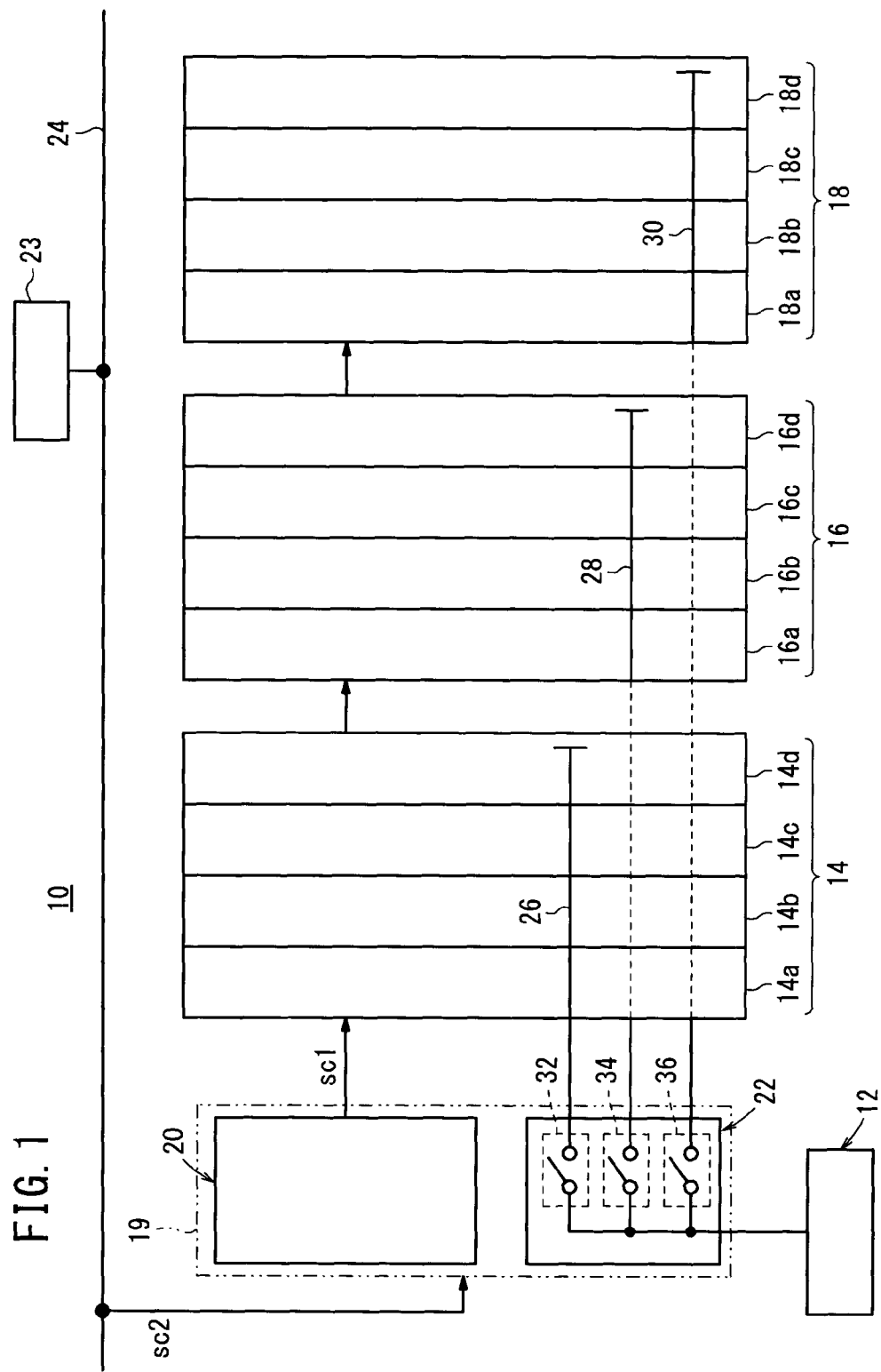
FIG. 1 is an outline schematic view of the configuration of a solenoid valve system according to a first embodiment of the present invention.

Preferred embodiments of a solenoid valve system according to the present invention will be described in detail below with reference to the accompanying drawings. In FIG. 1, reference numeral 10 indicates a solenoid valve system according to a first embodiment of the present invention.

As shown in FIG. 1, the solenoid valve system 10 is equipped with a power source 12, plural first through third solenoid valve units 14*a* to 14*d*, 16*a* to 16*d*, and 18*a* to 18*d* provided in the form of a manifold, an a control unit 19 for controlling an energized state, i.e., supply of power, from the power source 12 to the first through third solenoid valve units 14*a* to 14*d*, 16*a* to 16*d*, and 18*a* to 18*d*.

The control unit 19 comprises a serial transmission unit (herein after referred to simply as an SI unit) (solenoid valve control unit) 20, and a safety power source control unit (power source control unit) 22. The SI unit 20 performs sequential control by outputting a control signal sc1 to the first through third solenoid valve units 14*a* to 14*d*, 16*a* to 16*d*, and 18*a* to 18*d*. Further, the safety power source control unit 22 controls solenoid valves (not shown) in the first through third solenoid valve units 14*a* to 14*d*, 16*a* to 16*d*, and 18*a* to 18*d*, irrespective of the control signal sc1. Stated otherwise, the safety power source control unit 22 is capable of controlling the solenoid valves directly.

Further, the solenoid valve system 10 is equipped with an external control device 23 that serves as an external controller, such as a sequencer, a serial/parallel conversion unit, or a safety countermeasure type of PLC (Programmable Logic Controller) or the like. The external control device 23 is connected to the control unit 19 via a bus 24, and outputs an instruction signal sc2. Owing thereto, the SI unit 20 and the safety power source control unit 22 of the control unit 19 receive supply of the instruction signal sc2 from the external control device 23 via the bus 24.

The first through third solenoid valve units 14*a* to 14*d*, 16*a* to 16*d*, and 18*a* to 18*d* are divided respectively into a plurality of first through third groups 14, 16, and 18.

Further, in the solenoid valve system 10, the instruction signal sc2 for instructing operation of the first through third solenoid valve units 14*a* to 14*d*, 16*a* to 16*d*, and 18*a* to 18*d* is capable of being input from the external control device 23 with respect to each of the first through third groups 14, 16, and 18.

The power source 12 supplies a required voltage and current, and more specifically, a required power for enabling operation of each of the components in the solenoid valve system 10, and in particular, the solenoid valves (not shown) in the first through third solenoid valve units 14a to 14d, 16a to 16d, and 18a to 18d. The power source 12 is connected electrically and supplies power to the first through third solenoid valve units 14a to 14d, 16a to 16d, and 18a to 18d, for example, through the safety power source control unit 22.

The first through third solenoid valve units 14a to 14d, 16a to 16d, and 18a to 18d each include a non-illustrated input terminal, a non-illustrated output terminal, and a non-illustrated solenoid valve that is operated by a solenoid. The solenoid valves, for example, may be single-action type, double-action type, or three-position type solenoid valves.

For example, the first through third solenoid valve units 14a to 14d, 16a to 16d, and 18a to 18d are disposed sequentially from the side of the control unit 19 in order of the first solenoid valve units 14a to 14d, the second solenoid valve units 16a to 16d, and the third solenoid valve units 18a to 18d. Accordingly, in the first through third solenoid valve units 14a to 14d, 16a to 16d, and 18a to 18d, four solenoid valve units are disposed in order in a parallel manner. In addition, the first through third solenoid valve units 14a to 14d, 16a to 16d, and 18a to 18d are connected and arranged such that the output terminal of one adjacent solenoid valve unit is connected to the input terminal of another adjacent solenoid valve unit.

In such a connected condition, the input terminal of the first solenoid valve unit 14a constituting the one end is connected to the SI unit 20 of the control unit 19. Accordingly, the control signal sc1 from the SI unit 20 is input to the input terminal.

For example, in the first solenoid valve unit 14a, the solenoid valve of the first solenoid valve unit 14a is operated responsive to the control signal sc1 from the SI unit 20. Further, via the output terminal thereof, the first solenoid valve unit 14a inputs the control signal sc1 to the input terminal of an adjacent first solenoid valve unit 14b. In this manner, the control signal sc1 is input sequentially to the first through third solenoid valve units 14a to 14d, 16a to 16d, and 18a to 18d for operation.

Further, in the first through third solenoid valve units 14a to 14d, 16a to 16d, and 18a to 18d, power supply paths 26, 28, and 30 are provided respectively in the first through third groups 14, 16, and 18.

The power supply paths 26, 28, and 30, for example, are connected to the safety power source control unit 22 of the control unit 19, and are disposed respectively across the first through third solenoid valve units 14a to 14d, 16a to 16d, and 18a to 18d. Additionally, the power supply paths 26, 28, 30 supply power, which is supplied from the power source 12 via the safety power source control unit 22, respectively to the first through third solenoid valve units 14a to 14d, 16a to 16d, and 18a to 18d.

Accordingly, in the case that power is supplied from the power supply path 26 for the first group 14, the solenoid valves (not shown) of the first solenoid valve units 14a to 14d arranged in the first group 14 are placed in a state (hereinafter referred to as an "operable state") in which the solenoid valves can be controlled responsive to the control signal sc1 from the SI unit 20. On the other hand, in the case that power is not supplied to the solenoid valves from the power source 12, the solenoid valves are placed in a state (hereinafter referred to as an "inoperable state") in which the solenoid valves cannot be controlled even though the control signal sc1 is input thereto.

In a similar manner, the solenoid valves (not shown) of the second and third solenoid valve units 16a to 16d and 18a to 18d arranged respectively in the second and third groups 16 and 18 are placed in an operable state or an inoperable state, depending on the power supply from the power supply paths 28 and 30 for the second and third groups 16 and 18.

Moreover, in the solenoid valve system 10, the number of the first through third solenoid valve units 14a to 14d, 16a to 16d, and 18a to 18d is not limited to twelve, for example, as shown in FIG. 1. Stated otherwise, in the solenoid valve system 10, any desired number of solenoid valve units may be provided.

Further, as shown in FIG. 1, the first through third solenoid valve units 14a to 14d, 16a to 16d, and 18a to 18d are divided into three respective first through third groups 14, 16, and 18. The solenoid valve system 10 is not limited to the arrangement shown in FIG. 1, and the solenoid valve units may be divided into any desired number of groups of at least two or more.

Furthermore, in FIG. 1, the first through third solenoid valve units 14a to 14d, 16a to 16d, and 18a to 18d are divided, by four each, into the first through third groups 14, 16, and 18. However, the solenoid valve system 10 is not limited to the arrangement shown in FIG. 1, and any desired number of solenoid valve units of at least one or more may be provided in each of the groups.

The SI unit 20 is connected between the bus 24 and the first solenoid valve unit 14a. A control signal sc1 in response to the instruction signal sc2, which is input from the external control device 23 via the bus 24, is input from the SI unit 20 to the first solenoid valve unit 14a.

The safety power source control unit 22 is connected between the bus 24 and the first solenoid valve unit 14a. Responsive to the instruction signal sc2, which is input from the external control device 23 via the bus 24, the safety power source control unit 22 controls power supply to solenoid valves (not shown) of the first through third solenoid valve units 14a to 14d, 16a to 16d, and 18a to 18d, with respect to each of the first through third groups 14, 16, and 18.

Further, for example, as shown in FIG. 1, the safety power source control unit 22 is equipped with safety switches (switching means) 32, 34, and 36 respectively for the first through third groups 14, 16, and 18. Ends of the safety switches 32, 34, and 36 are connected respectively to the power source 12, whereas other ends thereof are connected respectively to the power supply paths 26, 28, and 30 in the first through third groups 14, 16, and 18.

In addition, responsive to the instruction signal sc2 from the external control device 23, the safety switches 32, 34, and 36 are constructed to be capable of switching ON or OFF the power supply state to the power supply paths 26, 28, 30 from the power source 12, for each of the first through third groups 14, 16 and 18. Further, the safety switches 32, 34, and 36 may be arranged with respect to both a plus side and a minus side of the power source 12.

The safety power source control unit 22 may be configured so as to be capable of outputting control signals separately with respect to the first through third groups 14, 16 and 18 responsive to the instruction signal sc2, whereby, in accordance with such control signals, the first through third solenoid valve units 14a to 14d, 16a to 16d, and 18a to 18d are controlled per each of the first through third groups 14, 16, and 18.

The bus 24 is connected to the control unit 19 together with being connected to the external control device 23. The aforementioned bus 24, for example, outputs an instruction signal sc2, which is input from the external control device 23 and concerns operations of the first through third solenoid valve units 14a to 14d, 16a to 16d, and 18a to 18d, to the SI unit 20 and the safety power source control unit 22 that constitute the control unit 19.

The solenoid valve system 10 according to the first embodiment of the present invention is basically constructed as described above. Next, operations and effects of the solenoid valve system 10 will be described.

Initially, in the case that the solenoid valve system 10 is used normally, all of the safety switches 32, 34, and 36 in the safety power source control unit 22 are in an ON state. More specifically, the power source 12 is connected respectively to the power supply paths 26, 28 and 30 via the safety power source control unit 22. Note that, in FIG. 1, the safety switches 32, 34, and 36 are shown as being in an OFF state.

In this case, power supplied from the power source 12 is supplied in turn respectively to the power supply paths 26, 28, 30 via the safety switches 32, 34, and 36. As a result, power is supplied to all of the first through third solenoid valve units 14a to 14d, 16a to 16d, and 18a to 18d in all of the first through third groups 14, 16, and 18.

Consequently, the solenoid valves (not shown) of all of the first through third solenoid valve units 14a to 14d, 16a to 16d, and 18a to 18d are placed in an operable state responsive to the control signal sc1 input from the SI unit 20.

On the other hand, upon use of the solenoid valve system 10, a case may occur in which solenoid valves of only part of the solenoid valve units, for example, solenoid valves of only the second solenoid valve units 16a to 16d which belong to the second group 16 becomes inoperable and is placed in an inoperable state. In this case, an instruction signal sc2 to instruct non-operation of the second group 16 is input from the external control device 23 to the safety power source control unit 22 via the bus 24.

Consequently, responsive to the instruction signal sc2, the safety power source control unit 22 switches only the safety switch 34 to an OFF state (while the safety switches 32, 36 remain ON). In this case, power from the power source 12 is supplied to the power supply paths 26 and 30 through the safety switches 32 and 36, and power is supplied to the first and third solenoid valve units 14a to 14d, 18a to 18d in the first and third groups 14, 18. Further, since the safety switch 34 is in an OFF state, power is not supplied to the power supply path 28, and power is not supplied to the second solenoid valve units 16a to 16d in the second group 16.

As a result, the solenoid valves of the first and third solenoid valve units 14a to 14d and 18a to 18d are placed in an operable state and can be operated responsive to the control signal sc1 input from the SI unit 20. On the other hand, the solenoid valves of the second solenoid valve units 16a to 16d are placed in an inoperable state and cannot be operated, even though the control signal sc1 is input thereto from the SI unit 20.

In the foregoing manner, according to the first embodiment, in the solenoid valve system 10, the first through third solenoid valve units 14a to 14d, 16a to 16d, and 18a to 18d are divided into the plural first through third groups 14, 16, and 18. In addition, the safety power source control unit 22 is provided, which directly controls solenoid valves (not shown) of the first through third solenoid valve units 14a to 14d, 16a to 16d, and 18a to 18d with respect to each of the first through third groups 14, 16, and 18. Owing thereto, the safety power source control unit 22 can control operation of the solenoid valves per group, i.e., in each of the first through third groups 14, 16, and 18.

As a result, with respect to groups having solenoid valves that should not be operated, the solenoid valves are rendered inoperable by the control signal sc1 from the SI unit 20, whereas with respect to other groups, the solenoid valves in the other groups can be controlled so as to be operable responsive to the control signal sc1. Stated otherwise, the groups having the solenoid valves can be selectively-controlled. Consequently, in the plural first through third solenoid valve units 14a to 14d, 16a to 16d, and 18a to 18d that are arranged in the form of a manifold, solenoid valves that should not be operated can be stopped from operating reliably and effectively, thereby enhancing safety.

For example, in the plural first through third solenoid valve units 14a to 14d, 16a to 16d, and 18a to 18d, in the case that an abnormality occurs in a portion of the solenoid valve units (e.g., the second solenoid valve units 16a to 16d), so that the portion of the solenoid valve units cannot be controlled by the control signal sc1, solenoid valves of that portion of the solenoid valve units, and solenoid valves of solenoid valve units that have a given relationship with the portion thereof are rendered inoperative, and safety of fluid pressure devices that are connected to the solenoid valve system 10 can be assured, whereas the solenoid valves of the other solenoid valve units can be maintained in an operable state.

More specifically, in the solenoid valve system 10, ends of the safety switches 32, 34, and 36 are connected to the power source 12, and further, other ends of the safety switches 32, 34, and 36 are connected respectively to the power supply paths 26, 28, and 30 provided respectively in the first through third groups 14, 16, and 18. Owing thereto, the safety power source control unit 22 can control the safety switches 32, 34, and 36 in each of the first through third groups 14, 16, and 18. As a result, supply of power from the power source 12 to the power supply paths 26, 28, and 30 can be switched individually and independently in each of the first through third groups 14, 16, and 18.

Accordingly, it is unnecessary for each of groups of solenoid valve units to be provide in the form of one manifold, and thus it is unnecessary to provide each of the groups with one power supply. In other words, with respect to the first through third solenoid valve units 14a to 14d, 16a to 16d, and 18a to 18d constructed in the form of a manifold, by providing a single power source 12, supply of power can be carried out to each of the plural first through third groups 14, 16, and 18. Owing thereto, the solenoid valve system 10 can be made smaller in scale, and layout freedom can be enhanced.

Further, with the first embodiment, although a structure is provided in which the safety switches 32, 34, and 36 are provided in the safety power source control unit 22 in order to switch supply of power on and off with respect to each of the power supply paths 26, 28, and 30 of the first through third groups 14, 16, and 18. However, the invention is not limited to such a structure.

Figure 2:
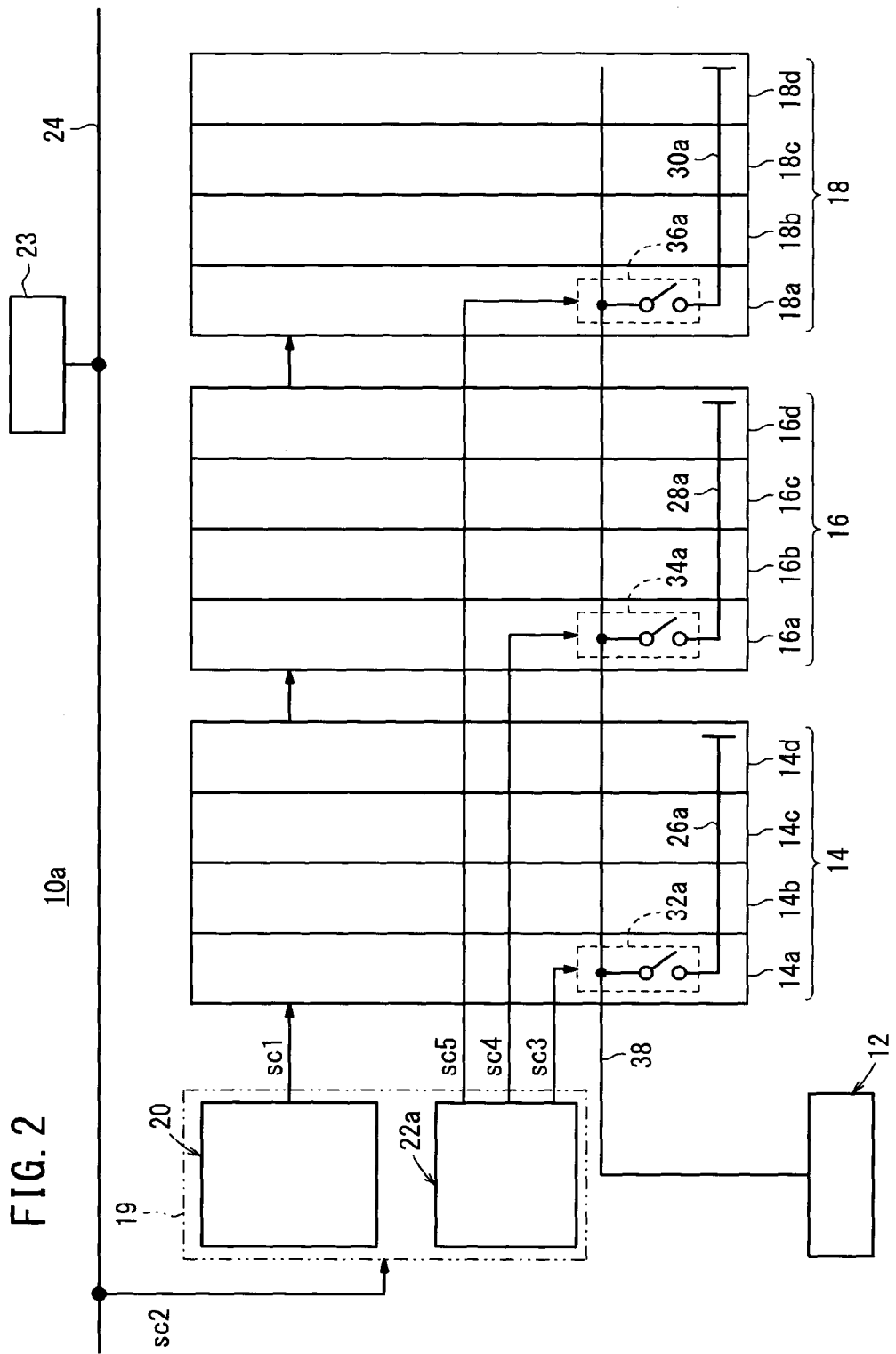
FIG. 2 is an outline schematic view depicting a modification of the solenoid valve system shown in FIG. 1.

For example, instead of providing the safety switches 32, 34, and 36 in the safety power source control unit 22, as in a solenoid valve system 10a according to a modification shown in FIG. 2, safety switches 32a, 34a, 36a may also be provided between power supply paths 26a, 28a, 30a and a common power supply path 38 disposed across the first through third groups 14, 16, and 18.

In this case, a safety power source control unit 22a constituting the solenoid valve system 10a is connected between the bus 24 and the first solenoid valve unit 14a without being connected to the power source 12. Further, the safety power source control unit 22a is configured so as to be capable of inputting control signals sc3, sc4, and sc5 respectively for the first through third groups 14, 16, and 18, respectively to the safety switches 32a, 34a, and 36a, responsive to the instruction signal sc2 from the external control device 23.

As discussed above, control signals from the safety power source control unit 22a to the first through third groups 14, 16, and 18 are not limited to parallel signals (sc3, sc4, sc5), which are output individually and respectively. For example, only the signal sc3 may be input as a serial signal respectively to the safety switches 32a, 34a, and 36a in order to control the same.

The safety switches 32a, 34a, and 36a are provided integrally in the solenoid valve units that are disposed on ends of the first through third groups 14, 16, and 18, e.g., in the first through third solenoid valve units 14a, 16a, and 18a that disposed on the side of the SI unit 20. Ends of the safety switches 32a, 34a, and 36a are connected to the common power supply path 38, which is connected to the power source 12 and is disposed across the first through third groups 14, 16, and 18. The common power supply path 38 supplies power supplied from the power source 12 to the safety switches 32a, 34a, and 36a, but does not supply power directly to the first through third solenoid valve units 14a to 14d, 16a to 16d, and 18a to 18d.

Further, the other ends of the safety switches 32a, 34a, and 36a are connected respectively to the power supply paths 26a, 28a, and 30a, and the power supply paths 26a, 28a, and 30a are disposed respectively across the first through third solenoid valve units 14a to 14d, 16a to 16d, and 18a to 18d in the first through third groups 14, 16, and 18.

Additionally, responsive to the control signals sc3, sc4, and sc5 input from the safety power source control unit 22a, the safety switches 32a, 34a, and 36a are capable of switching the power supply state from the power source 12 respectively to the power supply paths 26a, 28a, and 30a between ON and OFF states, respectively for the first through third groups 14, 16, and 18.

In the foregoing manner, with the solenoid valve system 10a according to the modification, the safety switches 32a, 34a, 36a are disposed integrally and respectively with respect to the first through third solenoid valve units 14a, 16a, and 18a. Owing thereto, since it is unnecessary for each of the first through third solenoid valve units 14a to 14d, 16a to 16d, and 18a to 18d to be equipped with all of the power supply paths 26a, 28a, 30a, a reduction in scale is possible. Further, considering the first solenoid valve units 14a to 14d (second solenoid valve units 16a to 16d, or third solenoid valve units 18a to 18d) collectively, the solenoid valve units can be formed (modularized) into one module, which is common to the first through third groups 14, 16, and 18.

Figure 3:
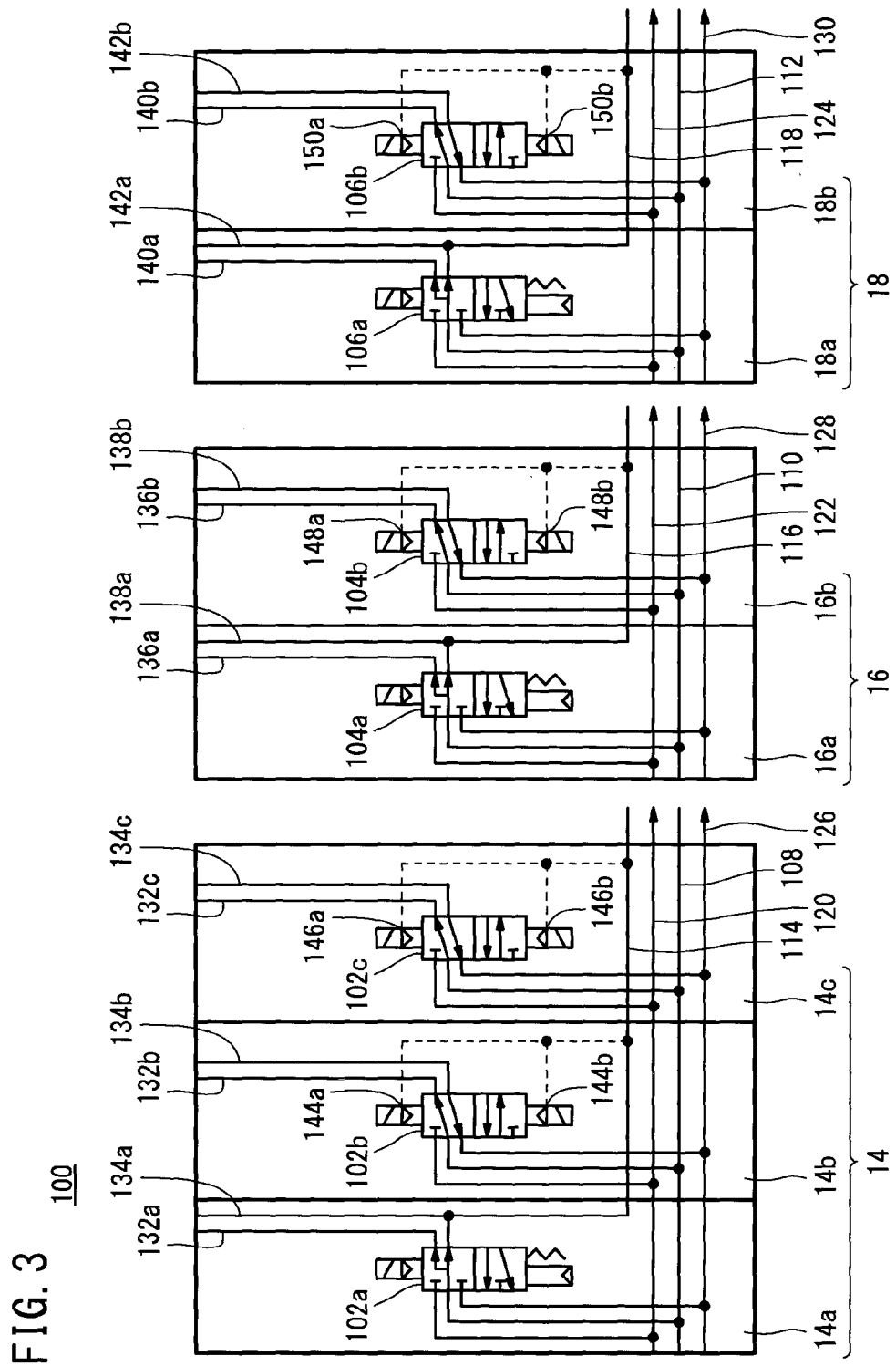
FIG. 3 is a circuit diagram of a solenoid valve unit in a state capable of being controlled by a control signal, in a solenoid valve system according to a second embodiment of the present invention.
Figure 4:
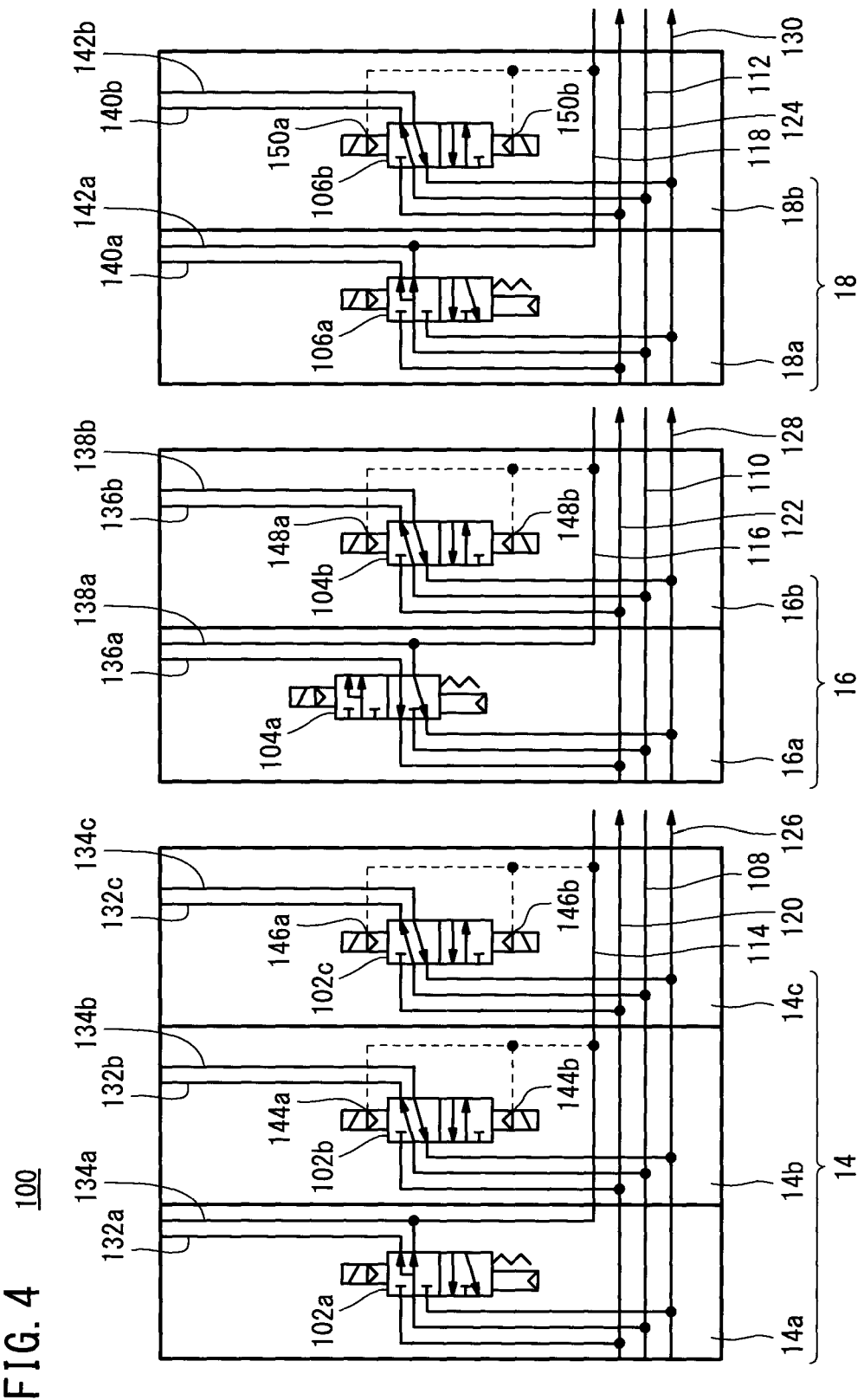
FIG. 4 is a circuit diagram of a solenoid valve unit in a state in which a second solenoid valve unit of a second group cannot be controlled, in the solenoid valve system shown in FIG. 3.

Next, first through third solenoid valve units 14a to 14c, 16a, 16b, 18a, 18b, which constitute a solenoid valve system 100 according to a second embodiment, are shown in FIGS. 3 and 4. Structural elements thereof, which are the same as those of the solenoid valve system 10 according to the first embodiment, are designated by the same reference characters, and detailed descriptions of such features are omitted.

The solenoid valve system 100 according to the second embodiment differs from the solenoid valve system 10 according to the first embodiment, in that the plural first through third groups 14, 16, and 18 include respectively first valves 102a, 104a, and 106a, second valves 102b and 102c, 104b, and 106b, and supply passages 108, 110, and 112 for supplying a fluid such as air or the like.

As an example, in FIGS. 3 and 4, the first group 14 is equipped with a first valve 102a and second valves 102b, 102c, the second group 16 is equipped with a first valve 104a and a second valve 104b, and the third group 18 is equipped with a first valve 106a and a second valve 106b.

Figure 5:
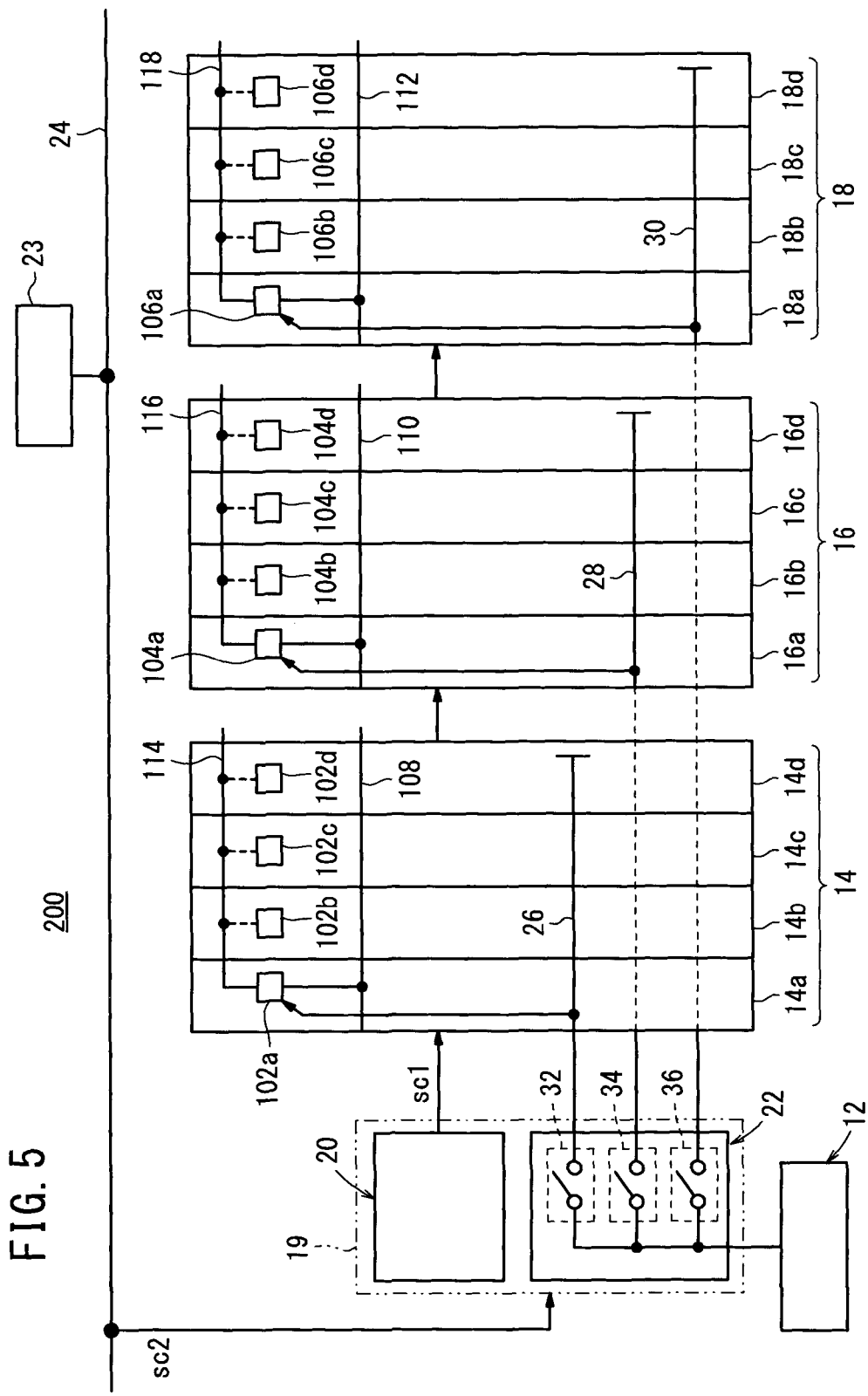
FIG. 5 is an outline schematic view of the configuration of a solenoid valve system according to a third embodiment of the present invention.
Figure 6:
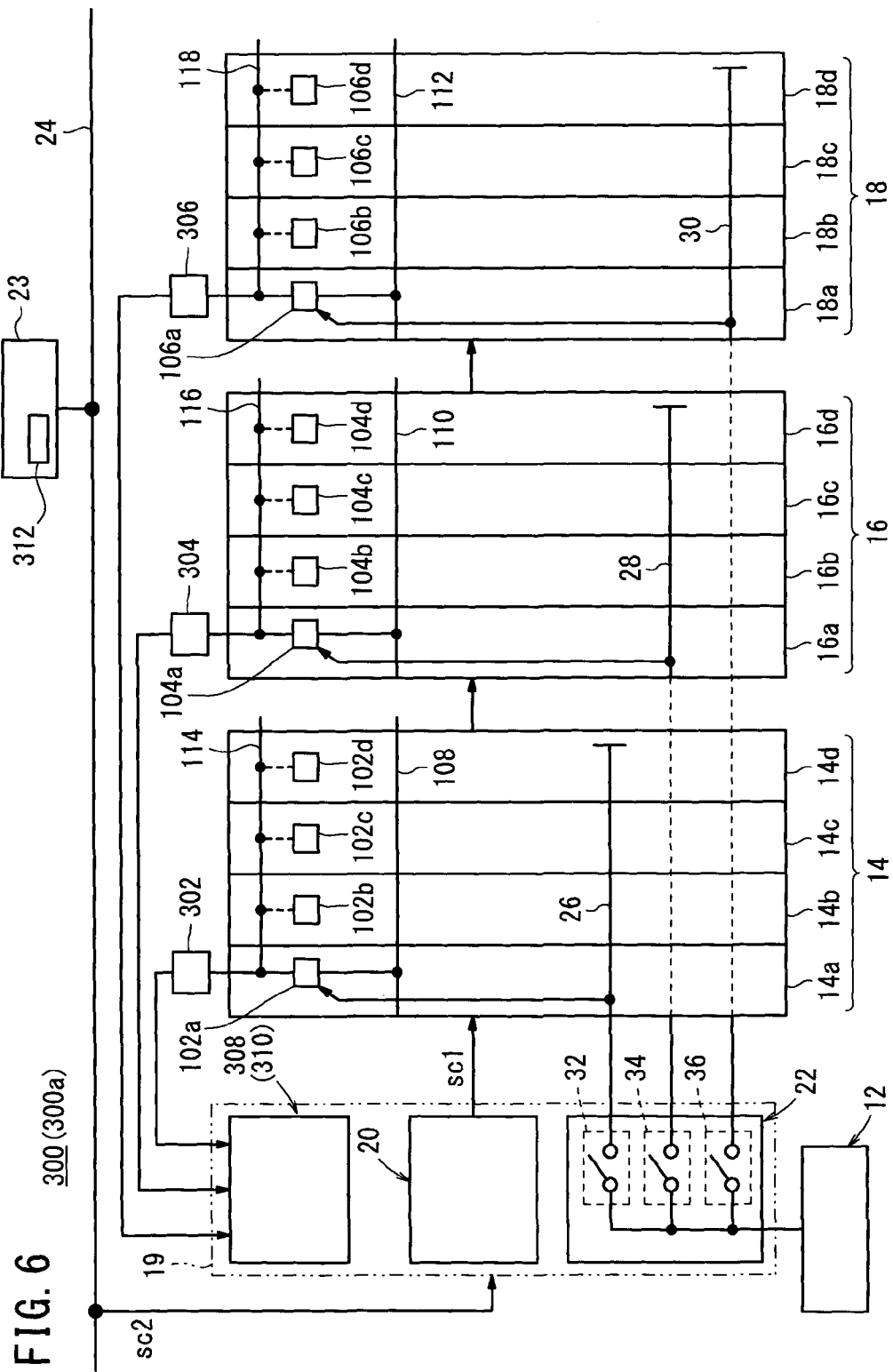
FIG. 6 is an outline schematic view of the configuration of a solenoid valve system according to a fourth embodiment of the present invention.

The solenoid valve system 100 is not limited to the configuration shown in FIGS. 3 and 4, and as shown in FIGS. 5 and 6 to be discussed later, the solenoid valve system 100 can also be applied to a case in which the first group 14 is equipped with a first valve 102a and second valves 102b to 102d, the second group 16 is equipped with a first valve 104a and second valves 104b to 104d, and the third group 18 is equipped with a first valve 106a and second valves 106b to 106d.

Returning to FIGS. 3 and 4, the first valves 102a, 104a, and 106a are switching valves provided respectively in the plural first through third groups 14, 16, and 18, which are switched responsive to controls from the safety power source control unit 22 (see FIG. 1) or the safety power source control unit 22a (see FIG. 2). Further, the second valves 102b, 102c, 104b, and 106b are switching valves for switching an operational state by means of an external pilot fluid from the first valves 102a, 104a, and 106a.

Further, in the solenoid valve system 100, in the case, for example, that the first, second, and third groups 14, 16, and 18 are equipped with two or more first, second, and third solenoid valve units 14a to 14d, 16a to 16d, and 18a to 18d, each of the groups 14, 16, 18 is constituted by being equipped with one first valve 102a, 104a, 106a, and one or more of the second valves 102b, 102c, 104b, 106b.

For the sake of convenience, in FIGS. 3 and 4, the first through third solenoid valve units 14d, 16c, 16d, 18c, and 18d are omitted from illustration, however, similar to the solenoid valve system 10 according to the first embodiment, in actuality, four first through third solenoid valve units 14a to 14d, 16a to 16d, and 18a to 18d are provided respectively in the first through third groups 14, 16, and 18.

Further, in the solenoid valve system 100, in each of the first through third groups 14, 16, and 18, an external pilot passage 114, 116, 118, a first discharge passage 120, 122, 124, and a second discharge passage 126, 128, 130 are disposed, and the external pilot passages 114, 116, 118, the first discharge passages 120, 122, 124, and the second discharge passages 126, 128, 130 are respectively across the first through third solenoid valve units 14a to 14d, 16a to 16d, and 18a to 18d.

The first valves 102a, 104a, and 106a are provided in solenoid valve units that constitute one end, respectively, of the first through third groups 14, 16, and 18, for example, respectively in the first through third solenoid valve units 14a, 16a, and 18a, which are arranged on the side of the control unit 19 (SI unit 20).

Further, the first valves 102a, 104a, and 106a are single-action type solenoid valves, which are switched respectively corresponding to switching of the safety switches 32, 34, and 36 by the safety power source control unit 22, or respectively corresponding to switching of control signals sc3, sc4, and sc5 by the safety power source control unit 22a.

The first valves 102a, 104a, and 106a, for example, comprise pilot valves operated by solenoids, and are switched responsive to operations of the respective pilot valves. The solenoids are controlled by the safety power source control unit 22 (22a). When supply of current to the corresponding solenoid is suspended by the safety power source control unit 22 (22a), the first valve 102a, 104a, and 106a interrupts communication between the supply passage 108, 110, 112 and the external pilot passage 114, 116, 118. Consequently, the external pilot passage 114, 116, and 118 is switched to a state (i.e., a discharge state) of communication with the second discharge passage 126, 128, and 130.

The first valves 102a, 104a, and 106a need not necessarily be controlled by the safety power source control unit 22 (22a), and for example, may be constructed to be switched responsive to control signals sc1 from the SI unit 20.

The second valves 102b, 102c, 104b, and 106b are disposed respectively in the first through third solenoid valve units 14b, 14c, 16b, and 18b apart from the first through third solenoid valve units 14a, 16a, and 18a. The second valves 102b, 102c, 104b, and 106b, for example, are double-action type solenoid valves, which are switched responsive to control signals sc1 from the SI unit 20. However, the second valves 102b, 102c, 104b, and 106b may also be constituted by single-action type solenoid valves.

Further, the second valves 102b, 102c, 104b, and 106b, for example, each comprise two pilot valves 144a and 144b, 146a and 146b, 148a and 148b, and 150a and 150b, which are switched respectively by solenoids. The pilot valves 144a and 144b, and 146a and 146b are connected to the external pilot passage 114, the pilot valves 148a and 148b are connected to the external pilot passage 116, and the pilot valves 150a and 150b are connected to the external pilot passage 118.

In addition, the second valves 102b, 102c, 104b, 106b switch the flow direction of the fluid, respectively by switching a communication state of the first ports 132b, 132c, 136b, 140b and the second ports 134b, 134c, 138b, 142b with respect to the supply passages 108, 110, 112, corresponding to the external pilot fluid, which is supplied from the first valves 102a, 104a, and 106a.

First ports 132a to 132c and second ports 134a to 134c through which a pressure fluid is supplied are provided respectively in the first solenoid valve units 14a to 14c. Similarly, first ports 136a, 136b, 140a, 140b and second ports 138a, 138b, 142a, 142b also are provided respectively in the second and third solenoid valve units 16a, 16b, 18a, 18b.

The supply passage 108 is connected to all of the valves in the first solenoid valve units 14a to 14d, i.e., the first valve 102a and the second valves 102b, 102c. The supply passage 110 is connected to all of the valves in the second solenoid valve units 16a to 16d, i.e., the first valve 104a and the second valve 104b. The supply passage 112 is connected to all of the valves in the third solenoid valve units 18a to 18d, i.e., the first valve 106a and the second valve 106b.

The external pilot passages 114, 116, and 118 are connected respectively to the second ports 134a, 138a, and 142a of the first through third solenoid valve units 14a, 16a, and 18a, together with being connected respectively to the second valves 102b and 102c, the second valve 104b, and the second valve 106b in the first through third solenoid valve units 14b to 14d, 16b to 16d, and 18b to 18d.

The first discharge passages 120, 122, and 124, as well as the second discharge passages 126, 128, and 130 also are connected respectively to the first valves 102a, 104a, and 106a, as well as the second valves 102b and 102c, the second valve 104b, and the second valve 106b, in the first through third solenoid valve units 14a to 14d, 16a to 16d, and 18a to 18d.

The pressure fluid, which is supplied to the supply passages 108, 110, and 112, may be supplied as the same fluid in a branched manner to each of the first through third groups 14, 16, and 18. More specifically, although each of the supply passages 108, 110, and 112 may be formed independently as shown in FIGS. 3 through 6, the supply passages may also be shared in common as a single common supply passage, and the same fluid can be made to flow therethrough.

Further, exhausts that are discharged from the first discharge passages 120, 122, and 124 may be aggregated in the same flow. More specifically, although as shown in FIGS. 3 through 6, each of the first discharge passages 120, 122, and 124 is formed independently, the discharge passages can be connected and shared commonly in a single discharge passage, and can be consolidated in the same flow.

Further, exhausts that are discharged from the second discharge passages 126, 128, and 130 may be aggregated in the same flow. More specifically, although as shown in FIGS. 3 through 6, each of the second discharge passages 126, 128, and 130 is formed independently, the discharge passages can be connected and shared commonly in a single discharge passage, and can be consolidated in the same flow.

The solenoid valve system 100 according to the second embodiment of the present invention is basically constructed as described above. Next, operations and effects of the solenoid valve system 100 will be described.

In this case, fluid is supplied beforehand to the supply passages 108, 110, and 112.

Initially, in the case that the solenoid valve system 100 is used normally, in order to cause the supply passages 108, 110, and 112 to be in communication respectively with the external pilot passages 114, 116, and 118, the first valves 102a, 104a, and 106a are operated by the safety power source control unit 22 (22a). Consequently, as shown in FIG. 3, the supply passages 108, 110, 112 are switched to a state of being in communication respectively with the first ports 132a, 136a, 140a and the second ports 134a, 138a, 142a. For example, all of the safety switches 32, 34, and 36 are placed in an ON state by the safety power source control unit 22, or alternatively, all of the control signals sc3, sc4, sc5 are placed in an ON state by the safety power source control unit 22a.

Thus, under a switching operation of the first valves 102a, 104a, and 106a, the supply passages 108, 110, and 112 are made to communicate respectively with the first ports 132a, 136a, 140a and the second ports 134a, 138a, 142a. As a result, fluid is supplied respectively to the first ports 132a, 136a, 140a and the second ports 134a, 138a, 142a via the first valves 102a, 104a, and 106a.

Further, fluid that is supplied to the second ports 134a, 138a, and 142a is supplied respectively to the external pilot passages 114, 116, and 118 as an external pilot fluid. Owing thereto, the external pilot fluid is supplied respectively to the second valves 102b, 102c, 104b, 106b of the first through third solenoid valve units 14b to 14d, 16b to 16d, and 18b to 18d.

Next, the external pilot fluid is supplied to pairs of the pilot valves 144a and 144b, 146a and 146b, 148a and 148b, and 150a and 150b respectively through the second valves 102b, 102c, 104b, and 106b.

At this time, the control signal sc1 is input with respect to the first through third solenoid valve units 14b to 14d, 16b to 16d, and 18b to 18d, thereby operating the second valves 102b, 102c, 104b, 106b. Consequently, as shown in FIG. 3, a state is switched to in which the supply passages 108, 110, 112 are placed in communication respectively with the first ports 132b and 132c, the first port 136b, and the first port 140b.

In this case, for example, in each of the second valves 102*b*, 102*c*, 104*b*, 106*b*, only one of the pairs of the pilot valves (i.e., 144*a*, 146*a*, 148*a*, 150*a*) is opened, whereas the other pilot valve (i.e., 144*b*, 146*b*, 148*b*, 150*b*) remains in a closed state. Consequently, the external pilot fluid is supplied only to the pilot valves 144*a*, 146*a*, 148*a*, and 150*a*. Thus, as shown in FIG. 3, the second valves 102*b*, 102*c*, 104*b*, 106*b* are switched under the action of the external pilot fluid, which has passed through the pilot valves 144*a*, 146*a*, 148*a*, and 150*a*.

Owing thereto, under a switching action of the second valves 102*b*, 102*c*, 104*b*, and 106*b*, the supply passages 108, 110, and 112 are placed in communication respectively with the first ports 132*b* and 132*c*, the first port 136*b*, and the first port 140*b*, whereas the second discharge passages 126, 128, and 130 are placed in communication respectively with the second ports 134*b* and 134*c*, the second port 138*b*, and the second port 142*b*. As a result, fluid is supplied to the first ports 132*b*, 132*c*, 136*b*, and 140*b* respectively via the second valves 102*b*, 102*c*, 104*b*, and 106*b*.

The first valves 102*a*, 104*a*, and 106*a* do not communicate with the first discharge passages 120, 122, and 124, or with the second discharge passages 126, 128, and 130. Further, the second valves 102*b*, 102*c*, 104*b*, and 106*b* do not communicate with the first discharge passages 120, 122, and 124.

On the other hand, as shown in FIG. 4, a case may occur upon use of the solenoid valve system 100 in which only a portion of the solenoid valves of the solenoid valve units, e.g., only solenoid valves of the second solenoid valve units 16*a* to 16*d* that constitute the second group 16, become inoperable or are put in a non-operable state.

In this case, first, an instruction signal sc2 from the external control device 23 to instruct non-operation of the second group 16 is input to the safety power source control unit 22 (22*a*) through the bus 24.

Responsive to the instruction signal sc2, the safety power source control unit 22 (22*a*) is controlled to switch the first valve 104*a* of the second group 16, thereby interrupting the state of communication between the supply passage 110 and the external pilot passage 116, and more specifically, the state of communication between the supply passage 110 and the first and second ports 136*a*, 138*a*, and to place the external pilot passage 116 in communication with the second discharge passage 128. By means of the safety power source control unit 22, for example, only the safety switch 34 pertaining to the second group 16 is placed in an OFF state, or alternatively, by means of the safety power source control unit 22*a*, only the control signal sc4 pertaining to the second group 16 is placed in an OFF state.

In this case, in the second group 16, concerning the first valve 104*a* thereof, the current to the solenoid or the fluid to the pilot valve is not supplied. Consequently, as shown in FIG. 4, only the first valve 104*a* is switched forcibly into a state which differs from that of the first valves 102*a*, 106*a*.

Concerning the first valves 102*a*, 106*a* and the second valves 102*b*, 102*c*, 106*b* provided in the other first and third groups 14 and 18, in which the state of communication between the supply passages 108, 112 and the external pilot passages 114, 118 is maintained, since operations thereof have already been discussed above, details of such operations are omitted.

Owing thereto, by switching the state of the first valve 104*a*, the first discharge passage 122 and the second discharge passage 128 are placed in communication respectively with the first port 136*a* and the second port 138*a*. More specifically, since communication is suspended between the supply passage 110 and the first port 136*a* and the second port 138*a*, fluid is not supplied to the first port 136*a* and the second port 138*a*.

Accordingly, the external pilot passage 116 connected to the second port 138*a* is placed in communication with the second discharge passage 128 so as not to supply the external pilot fluid, and the external pilot fluid is not supplied to the second solenoid valve units 16*b* to 16*d* in the second group 16. For example, at the second valve 104*b* of the second solenoid valve unit 16*b*, since the external pilot fluid is not supplied to either of the pilot valves 148*a* and 148*b*, an inoperable (non-switchable) state is brought about in which the second valve 104*b* cannot be switched, and the state shown in FIG. 4 is maintained in which operation does not occur, even if the control signal sc1 is input thereto.

In the foregoing manner, in the solenoid valve system 100 according to the second embodiment, in the first through third groups 14, 16, and 18, there are provided respectively the first valves 102*a*, 104*a*, and 106*a*, the fluid communication state of which is capable of being switched responsive to controls from the safety power source control unit 22 (22*a*), the second valves 102*b* and 102*c*, 104*b*, and 106*b*, the operational state of which is switched by the external pilot fluid from the first valves 102*a*, 104*a*, and 106*a*, and the supply passages 108, 110, and 112.

As a result, in each of the first through third groups 14, 16, and 18, if the safety power source control unit 22 (22*a*) directly controls switching operations of at least one of the solenoid valves, more specifically the first valve 102*a*, 104*a*, 106*a*, supply of the external pilot fluid from the first valve 102*a*, 104*a*, 106*a* to the other valves, i.e., the second valve 102*b*, 102*c*, 104*b*, 106*b*, can be controlled. More specifically, the operational state of the second valves 102*b*, 102*c*, 104*b*, and 106*b* can be controlled.

Accordingly, by means of the control signal sc1 from the SI unit 20, solenoid valves with respect to groups having solenoid valves therein that should be in an inoperable state are controlled to be inoperable, whereas solenoid valves with respect to other groups can be maintained in an operable state. As a result, in the plural first through third solenoid valve units 14*a* to 14*d*, 16*a* to 16*d*, and 18*a* to 18*d* provided in the form of a manifold, solenoid valves that should not be operated are stopped from operating reliably and effectively, whereby safety can be further enhanced.

Next, a solenoid valve system 200 according to a third embodiment is shown in FIG. 5. Structural elements thereof, which are the same as those of the solenoid valve system 10 according to the first embodiment and the solenoid valve system 100 according to the second embodiment, are designated by the same reference characters, and detailed descriptions of such features are omitted.

The solenoid valve system 200 according to the third embodiment differs from the solenoid valve system 10 according to the first embodiment and the solenoid valve system 100 according to the second embodiment, in that the first valves 102*a*, 104*a*, and 106*a* in the first through third groups 14, 16, and 18 are controlled, in response respectively to controls of the power supply paths 26, 28, and 30 of the first through third groups 14, 16, and 18.

In the solenoid valve system 200, the first valves 102*a*, 104*a*, and 106*a* are connected respectively to the power supply paths 26, 28, and 30, or other ends of the safety switches 32, 34, and 36. Owing thereto, power supplied to the power supply paths 26, 28, and 30 is supplied to the first valves 102*a*, 104*a*, and 106*a*, and is used for operating the first valves 102*a*, 104*a*, and 106*a* as solenoid valves.

More specifically, operational states of the first valves 102*a*, 104*a*, and 106*a* are switched respectively, responsive to the power supplied to the power supply paths 26, 28, and 30.

The solenoid valve system 200 according to the third embodiment of the present invention is basically constructed as described above. Next, operations and effects of the solenoid valve system 200 will be described.

First, when the safety power source control unit 22 places the safety switches 32, 34, 36 in an ON state, power from the power source 12 is supplied to the power supply paths 26, 28, 30, and the power is supplied in turn to the first valves 102*a*, 104*a*, 106*a*.

In this case, the first valves 102*a*, 104*a*, 106*a* are placed in an operable state, in which power from the power supply paths 26, 28, 30 is supplied to the solenoids.

Operations that take place after the first valves 102*a*, 104*a*, 106*a* have been placed in an operable state have already been described in relation to the second embodiment, and therefore detail descriptions of such operations are omitted.

On the other hand, if the safety power source control unit 22 places the safety switches 32, 34, 36 in an OFF state, power from the power source 12 is not supplied to the power supply paths 26, 28, 30, and the power also is not supplied to the first valves 102*a*, 104*a*, 106*a*.

In this case, the first valves 102*a*, 104*a*, 106*a* are switched so as to interrupt the state of communication between the external pilot passages 114, 116, 118 and the supply passages 108, 110, 112.

Operations that take place after the first valves 102*a*, 104*a*, 106*a* have been placed in an inoperable state have already been described above, and therefore detailed descriptions of such operations are omitted.

More specifically, as shown in FIG. 5, the second valves 102*b* to 102*d* are connected to the external pilot passage 114, the second valves 104*b* to 104*d* are connected to the external pilot passage 116, and the second valves 106*b* to 106*d* are connected to the external pilot passage 118. As noted previously, with the solenoid valve system 100 shown in FIGS. 3 and 4, operational states of the second valves 102*b*, 102*c*, 104*b*, and 106*b* are switched by the external pilot fluid from the first valves 102*a*, 104*a*, and 106*a*. Owing thereto, with the solenoid valve system 200 of FIG. 5, similar to the case of FIGS. 3 and 4, operational states of the second valves 102*b* to 102*d*, 104*b* to 104*d*, and 106*b* to 106*d* are switched by the external pilot fluid from the first valves 102*a*, 104*a*, and 106*a*.

In the foregoing manner, according to the third embodiment, in the solenoid valve system 200, the first valves 102*a*, 104*a*, and 106*a* in the first through third groups 14, 16 and 18 are operated separately, in response respectively to controls of the power supply paths 26, 28, 30 in the first through third groups 14, 16, and 18, as performed by the safety power source control unit 22.

Consequently, the safety power source control unit 22 controls the supply state of power with respect to the power supply paths 26, 28, 30, and operational states of the first valves 102*a*, 104*a*, 106*a* are controlled based on such a power control. Furthermore, based on the operational states of the first valves 102*a*, 104*a*, 106*a*, operational states of the second valves 102*b* to 102*d*, 104*b* to 104*d*, and 106*b* to 106*d* can be controlled.

As a result, control of the operative states of solenoid valves in the first through third groups 14, 16 and 18 can be performed in tandem by controlling the power supply, and by controlling supply of the external pilot fluid. As a result, in plural solenoid valve units provided in the form of a manifold, solenoid valves that should not be operated are stopped from operating reliably and effectively, whereby safety can be further enhanced.

Next, a solenoid valve system 300 according to a fourth embodiment is shown in FIG. 6. Structural elements thereof, which are the same as those of the solenoid valve system 200 according to the third embodiment, are designated by the same reference characters, and detailed descriptions of such features are omitted.

The solenoid valve system 300 according to the fourth embodiment differs from the solenoid valve system 200 according to the third embodiment, in that supply state detecting units 302, 304, and 306 are provided, which detect the supply state of the external pilot fluid in the external pilot passages 114, 116, and 118. Further, in the solenoid valve system 300, the control unit 19 comprises a supply state determining unit 308 for carrying out a determination for the supply state of the external pilot fluid, which is detected by the supply state detecting units 302, 304, and 306.

The supply state detecting units 302, 304, and 306, for example, are arranged respectively in the first through third groups 14, 16, and 18, and are disposed respectively between the supply state determining unit 308 and the first through third solenoid valve units 14*b* to 14*d*, 16*b* to 16*d*, and 18*b* to 18*d*. Further, the supply state detecting units 302, 304, and 306, for example, are made up from pressure sensors, which are capable of detecting a pressure of the fluid, and are connected respectively to the external pilot passages 114, 116, and 118. In this case, the supply state detecting units 302, 304, and 306 detect respectively the pressure of the external pilot fluid supplied to the external pilot passages 114, 116, and 118, and more specifically, the pressure of the external pilot fluid that is supplied to the second valves 102*b* to 102*d*, 104*b* to 104*d*, and 106*b* to 106*d*, thereby detecting the supply state of the external pilot fluid. The supply state is output as an electrical signal to the supply state determining unit 308.

The supply state determining unit 308 is disposed between the bus 24 and the supply state detecting units 302, 304, and 306, and is input with the supply state of the external pilot fluid that was detected by the supply state detecting units 302, 304, and 306. Based on the input supply state, the supply state determining unit 308 determines whether or not the external pilot fluid is being supplied appropriately from the first valves 102*a*, 104*a*, and 106*a* to the external pilot passages 114, 116, and 118, respectively, and more specifically, whether or not the external pilot fluid is being supplied suitably to the second valves 102*b* to 102*d*, 104*b* to 104*d*, and 106*b* to 106*d*.

Additionally, the supply state determining unit 308, for example, compares the supply states of the external pilot fluid in the first through third groups 14, 16, and 18, respectively with the instruction signals sc2 of the first through third groups 14, 16, and 18, which are input to the control unit 19 from the external control device 23 via the bus 24, and determines whether or not they are consistent with each other. In relation to groups the consistency of which is logically inconsistent, the supply state determining unit 308 can determine that an abnormality such as a failure of the solenoid valves or the like has occurred.

The solenoid valve system 300 according to the fourth embodiment of the present invention is basically constructed as described above. Next, operations and effects of the solenoid valve system 300 will be described.

First, upon initiation of the solenoid valve system 300, an instruction signal sc2, which is capable of operating the solenoid valves with respect to all of the first through third groups 14, 16, and 18, is input to the safety power source control unit 22. By means of the instruction signal sc2, when the safety switches 32, 34, and 36 are switched to an ON state, power from the power source 12 is supplied to the power supply paths 26, 28, 30, the power being supplied in turn to the first through third solenoid valve units 14a to 14d, 16a to 16d, and 18a to 18d.

Consequently, power is supplied from the power supply paths 26, 28, 30 to the first valves 102a, 104a, 106a, and under a switching action of the first valves 102a, 104a, 106a, the supply passages 108, 110, 112 are placed in communication with the external pilot passages 114, 116, 118 via the second ports 134a, 138a, 142a (see FIG. 3). As a result, the external pilot fluid from the supply passages 108, 110, 112 is supplied respectively to the second valves 102b to 102d, 104b to 104d, 106b to 106d of the first through third solenoid valve units 14b to 14d, 16b to 16d, 18b to 18d. Consequently, control of operations of the first through third solenoid valve units 14b to 14d, 16b to 16d, 18b to 18d can be carried out by the power supplied from the power source 12 under a switching action of the safety switches 32, 34, 36, as well as by the external pilot fluid supplied through the external pilot passages 114, 116, 118.

On the other hand, when the safety switches 32, 34, 36 are switched to an OFF state, since the supply of power to the first through third solenoid valve units 14a to 14d, 16a to 16d, 18a to 18d is stopped, power also is not supplied to the first valves 102a, 104a, 106a, and the first valves 102a, 104a, 106a are put in a state in which energization thereof is suspended. Owing thereto, supply of the external pilot fluid to the first through third solenoid valve units 14b to 14d, 16b to 16d, 18b to 18d from the external pilot passages 114, 116, 118 by operation of the first valves 102a, 104a, 106a is halted. As a result, by placing the safety switches 32, 34, 36 in an OFF state, the first through third solenoid valve units 14a to 14d, 16a to 16d, 18a to 18d are rendered electrically inoperable, while by stopping supply of the external pilot fluid, the first through third solenoid valve units 14a to 14d, 16a to 16d, 18a to 18d are placed in an inoperable state, thereby enabling safety to be enhanced.

Further, the supply state detecting units 302, 304, and 306 detect the pressure, etc., of the external pilot fluid in the external pilot passages 114, 116, and 118.

Next, the supply state determining unit 308 determines the supply states (pressures) that are detected and input by the supply state detecting units 302, 304, and 306, and then determines, for example, whether or not a logical inconsistency exists in relation to the consistency between the supply states and the instruction signals sc2 of the first through third groups 14, 16, and 18.

Thus, with the supply state determining unit 308, it can be confirmed whether or not the external pilot fluid is being supplied appropriately to the external pilot passages 114, 116, and 118.

In the foregoing manner, according to the fourth embodiment, in the solenoid valve system 300, there are provided the supply state detecting units 302, 304, and 306, which detect the supply states of the external pilot fluids in the external pilot passages 114, 116, and 118, and the supply state determining unit 308 for carrying out a determination in relation to the supply states detected by the supply state detecting units 302, 304, and 306. Owing thereto, it can be determined whether or not the external pilot fluid is being supplied appropriately to the external pilot passages 114, 116, and 118 via the first valves 102a, 104a, and 106a.

As a result, if the external pilot fluid is supplied to the external pilot passage 114, 116, or 118 despite of supply of the instruction signal sc2 for instructing the corresponding solenoid valve to be placed in an inoperable state, then failures of the safety power source control unit 22 or the safety switches 32, 34, 36, or damage such as disconnections of the power supply paths 26, 28, 30 can be detected. Accordingly, malfunctions of the first valves 102a, 104a, and 106a can reliably be detected. Owing thereto, in plural solenoid valve units provided in the form of a manifold, solenoid valves that should not be operated can be stopped from operating more reliably and effectively, and safety can be further enhanced.

Further, in the fourth embodiment, in place of the above-described structure, a solenoid valve system 300a may be provided in which the supply state detecting unit 302 is configured as a pressure switch, the supply state determining unit 308 is replaced by an input circuit 310, and the supply state determining unit 312 is provided in the external control device 23.

Operations of the solenoid valve system 300a, which differ from the solenoid valve system 300, will be described below with reference to the timing chart of FIG. 7. FIG. 7 is a timing chart showing timewise changes of respective components, from supply of the instruction signal sc2, which instructs stopping supply of the external pilot fluid by non-operation of the solenoid valves, until residual pressure information is input to the external control device 23, in a case in which, from the standpoint of safety, it is necessary for respective solenoid valves to be placed in an inoperable state and for supply of external pilot fluid to reliably be suspended.

First, at time t0, by switching an instruction signal supplied to the control unit 19 via the bus 24 from an ON signal to an OFF signal, the external control device 23 instructs non-operation of the solenoid valves with respect to all of the first through third groups 14, 16, and 18. Owing thereto, at time t1, in accordance with the instruction signal sc2, the safety power source control unit 22 switches the safety switches 32, 34, 36 from an ON state to an OFF state. The period from time t0 to time t1 represents a time period (time delay) required until the instruction signal sc2 from the external control device 23 is supplied to the safety power source control unit 22 via the bus 24. As a result, because supply of current from the power source to the power supply paths 26, 28, 30 is cut off, from time t1 to time t2, the voltages of the power supply paths 26, 28, 30 decrease from the voltage Von supplied from the power source 12 to zero (0 V). Accordingly, supply of power to the first through third solenoid valve units 14a to 14d, 16a to 16d, and 18a to 18d is stopped, and power is not supplied to the first valves 102a, 104a, 106a.

Owing thereto, by operation of the first valves 102a, 104a, 106a, supply of the external pilot fluid from the external pilot passages 114, 116, 118 to the first through third solenoid valve units 14b to 14d, 16b to 16d, and 18b to 18d is halted. As a result, after time t2, the external pilot fluid that flows in the external pilot passages 114, 116, 118 is gradually discharged, and as time elapses, the pressure of the external pilot fluid decreases from the pressure Pon corresponding to the voltage Von.

Next, at time t3, when the pressure of the external pilot fluid reaches a predetermined pressure Poff, the supply state detecting units 302, 304, 306, which are constituted by pressure switches, output pressure confirmation signals (output signals) to the input circuit 310, which are indicative of the pressure of the external pilot fluid having been lowered to the pressure Poff.

The pressure Poff is defined as a minimum pressure value (e.g., atmospheric pressure or a pressure in the vicinity of atmospheric pressure) of the external pilot fluid required to enable switching of the operational states of the second valves 102b to 102d, 104b to 104d, and 106b to 106d. Accordingly, if the pressure of the external pilot fluid is lowered to the pressure Poff, the second valves 102b to 102d, 104b to 104d, and 106b to 106d can be switched from an operable state to an inoperable state.

In the case that the pressure confirmation signals from the supply state detecting units 302, 304, 306 are input, in accordance with the pressure confirmation signals, the input circuit 310 outputs information, including confirmation that the safety switches 32, 34, 36 have been placed in an OFF state, etc., as residual pressure information pertaining to the pressure of the external pilot fluid (i.e., information indicative of switching from the operative state (ON) to the inoperative state (OFF)), via the bus 24 to the external control device 23.

In this case, since the pressure confirmation signals from the supply state detecting units 302, 304, 306 are input to the input circuit 310, the residual pressure information, which is output from the input circuit 310 to the external control device 23, represents information for each of the supply state detecting units 302, 304, 306.

In addition, at time t4, the residual pressure information is input via the bus 24 to the supply state determining unit 312 of the external control device 23. The time period from time t3 to time t4 is a time (time delay) required for the supply state detecting units 302, 304, 306 to output the pressure confirmation signals, and for the input circuit 310 to generate residual pressure information and supply the residual pressure information via the bus 24 to the external control device 23.

Based on the input residual pressure information and the instruction content of the instruction signal sc2, the supply state determining unit 312 determines whether or not the instruction content, which is indicative of non-operation of all of the solenoid valves, is consistent with results indicative of the respective residual pressure information corresponding to the supply state detecting units 302, 304, and 306.

In this case, the supply state determining unit 312 determines whether or not the time period T0 from time t0 at which the instruction signal sc2 is switched from an ON signal to an OFF signal until time t4 at which the residual pressure information is input, is shorter than a preset threshold time period T.

More specifically, if the time period T0 is shorter than the threshold time period T (T0<T), the supply state determining unit 312 determines that the first through third solenoid valve units 14a to 14d, 16a to 16d, and 18a to 18d are functioning normally. Further, if the time period T0 is equal to or greater than the threshold time period T (T0≥T), among the first through third solenoid valve units 14a to 14d, 16a to 16d, and 18a to 18d, it is determined that an abnormality such as a failure or the like has occurred in the solenoid valve unit corresponding to the supply state detecting unit 302, 304, 306 in which it was detected that the time period T0 was greater than or equal to T, i.e., that the time period T0 satisfied the inequality T0≥T.

The threshold time period T is longer than the time period T0 of the normal solenoid valve units, and is an adjustable time, which is obtained by adding a given time margin Tα to the time period T0 (T=T0+Tα).

More specifically, the time period T1 from time t2 to time t3 is changed according to the configuration of the pneumatic devices (pneumatic circuits) that are connected by the solenoid valve system 300a, for example, the length and volume of the pneumatic devices such as the first valves 102a, 104a, and 106a, etc., and the length and volume of tubes such as the external pilot passages 114, 116, and 118, etc. Thus, the length of the normal time period T0 also is changed according to the pneumatic devices.

Further, in addition to the time period T1, the time period T0 includes the time delay from time t1 to time t2, and the time delay from time t3 to time t4.

Thus, according to the fourth embodiment, the threshold time period T can be set arbitrarily taking into consideration changes in structure of the solenoid valve system 300a or the time delays due to the configuration of the solenoid valve system 300a.

More specifically, the threshold time period T is a time pertaining to the pressure of the external pilot fluid, and is set to be longer by a certain margin than the time period T0 representative of a normal operation time, and is a set parameter value that can be set freely by the user to any arbitrary time. Owing thereto, assuming that the time period T0 resides within the preset threshold time period T, the supply state determining unit 312 can determine accurately that the first through third solenoid valve units 14a to 14d, 16a to 16d, and 18a to 18d are functioning normally. Further, in the event that the time period T0 is equal to or greater than the threshold time period T, the supply state determining unit 312 can determine accurately that an abnormality has occurred in any one of the solenoid valve units.

In relation to the fourth embodiment, a case has been described in which an abnormality of a solenoid valve unit occurs, as one example of an abnormality such as a failure or the like determined by the supply state determining unit 312. However, the fourth embodiment is not limited to determining abnormalities in the solenoid valve units.

For example, cases may also occur in which the residual pressure information is not switched from ON to OFF within the threshold time period T, due to abnormalities of the aforementioned various types of pneumatic devices, disconnection or shorting of the wires to the first valves 102a, 104a, and 106a, sticking or shorting of the safety switches 32, 34, and 36, malfunctioning of the first valves 102a, 104a, and 106a, or failures of the supply state detecting units 302, 304, and 306.

More specifically, according to the fourth embodiment, in the case that the residual pressure information is not switched from ON to OFF within the threshold time period T, the supply state determining unit 312 can determine that an abnormality such as a failure or the like has occurred at some location among the components of the solenoid valve system 300a pertaining to the sequence of operations shown in FIG. 7 in the period from supply of the instruction signal sc2 until the residual pressure information is input.

In the foregoing manner, with the solenoid valve system 300a, which is a modification of the solenoid valve system 300 according to the fourth embodiment of the present invention, in the case that the instruction signal sc2 is supplied to the control unit 19 from the external control device 23, the input circuit 310 outputs residual pressure information to the external control device 23 via the bus 24. Consequently, a responsive result (residual pressure information) at the side of the first through third solenoid valve units 14*a* to 14*d*, 16*a* to 16*d*, and 18*a* to 18*d*, with respect to the instruction signal sc2 from the external control device 23, can be fed back to the external control device 23.

Further, the supply state determining unit 312 of the external control device 23 determines whether or not the residual pressure information and the instruction content of the instruction signal sc2 are consistent. Owing thereto, on the side of the external control device 23, it can be grasped whether or not operations of the first through third solenoid valve units 14*a* to 14*d*, 16*a* to 16*d*, and 18*a* to 18*d* are consistent with the instruction content instructed by the instruction signal sc2 from the external control device 23.

Furthermore, in the event that the instruction content of the instruction signal sc2 and the residual pressure information are inconsistent, more specifically, if a time period T0 is equal to or greater than the threshold time period T, it can be reliably grasped on the side of the external control device 23, for example, that an abnormality has occurred, such as a failure of a solenoid valve unit corresponding to the supply state detecting unit 302, 304, 306 in which the time period T0 was detected.

Moreover, with the solenoid valve system 300*a*, similar to the solenoid valve system 300, the supply state determining unit 308 in the control unit 19 may possess a function similar to that of the supply state determining unit 312 of the external control device 23, and then the supply state determining unit 308 may determine consistency between the instruction signal sc2 and the residual pressure information. In this case, it is only necessary for the supply state determining unit 308 to notify the external control device 23 of only the determination result via the bus 24.

Further, with the solenoid valve system 300*a*, in place of the instruction signal sc2 being supplied from the external control device 23, the supply state determining unit 308, 312 may generate the instruction signal sc2 and carry out the operations shown by the timing chart of FIG. 7. In the case that the supply state determining unit 312 is provided in the external control device 23, the instruction signal sc2 is supplied from the supply state determining unit 312. On the other hand, in the case that the supply state determining unit 308 is provided in the control unit 19, the instruction signal sc2 is supplied from the supply state determining unit 308. In this case as well, it can be determined whether an abnormality, such as a failure of a solenoid valve unit or the like, has occurred.

Furthermore, with the solenoid valve system 300*a*, although a case has been described in which the supply state detecting units 302 to 306 are constituted by pressure switches, pressure sensors may also be used, similar to the case of the solenoid valve system 300. In this case, the input circuit 310 outputs residual pressure information to the external control device 23 via the bus 24, the residual pressure information including information indicative of lowering of the pressure of the external pilot fluid, which is detected by the supply state detecting units 302 to 306, to the value Poff. In this case, by comparing the time period T0 with the threshold time period T, the supply state determining unit 312 of the external control device 23 can determine whether or not an abnormality such as a failure or the like has occurred in the solenoid valve units.

The solenoid valve system according to the present invention is not limited to the above embodiments. Various changes and modifications may be made to the embodiments without departing from the scope of the invention as set forth in the appended claims.

The invention claimed is:

1. A solenoid valve system having a plurality of solenoid valve units provided in the form of a manifold, the solenoid valve units being controlled respectively by control signals,
wherein the plurality of solenoid valve units are divided into a plurality of groups;
the solenoid valve system further comprises a control unit for directly controlling solenoid valves in the plurality of solenoid valve units with respect to each of the plurality of groups, regardless of the control signals; and
wherein, in a condition in which the control signals are input to the solenoid valve units, the control unit switches between an operable state in which the solenoid valve units are capable of being controlled, and an inoperable state in which the solenoid valve units cannot be operated.

2. The solenoid valve system according to claim 1, wherein the control unit comprises:
a solenoid valve control unit for outputting the control signals to the solenoid valve units to thereby control the solenoid valve units; and
a power source control unit for switching between the operable state and the inoperable state of the solenoid valve units.

3. The solenoid valve system according to claim 2, further comprising:
a power source for supplying electric power to the plurality of solenoid valve units; and
a plurality of power supply paths connecting the plurality of solenoid valve units and the power source with respect to each of the plurality of groups,
wherein the power source control unit controls a power supply state in which power is supplied from the power source to the plurality of power supply paths, with respect to each of the plurality of groups.

4. The solenoid valve system according to claim 3, further comprising:
switching means for connecting the plurality of power supply paths and the power source,
wherein, responsive to a control of the power source control unit, the switching means switches the power supply state in which power is supplied to the power supply paths.

5. The solenoid valve system according to claim 4, wherein:
the power source control unit is disposed between the power source and the solenoid valve units; and
the switching means is provided in the power source control unit.

6. The solenoid valve system according to claim 4, wherein the switching means is provided in each of the plurality of groups.

7. The solenoid valve system according to claim 1, wherein:
each of the groups comprises at least two of the solenoid valve units;
one of the solenoid valve units includes a first valve, an operational state of which is switched responsive to a control of the control unit;
another of the solenoid valve units includes a second valve, an operational state of which is switched responsive to a supply state of fluid supplied under a switching action of the first valve.

8. The solenoid valve system according to claim 7, wherein each of the groups comprises a supply state detecting unit for detecting the supply state of fluid that is supplied to the second valve.

9. The solenoid valve system according to claim 8, wherein the supply state detecting unit comprises a pressure sensor for detecting a pressure of the fluid, or a pressure switch for outputting an output signal indicative of lowering of the pressure of the fluid to a predetermined pressure.

10. The solenoid valve system according to claim 9, further comprising a supply state determining unit that determines whether or not the fluid from the first valve is being supplied appropriately to the second valve, based on the supply state of the fluid detected by the supply state detecting unit.

11. The solenoid valve system according to claim 10, wherein:
    the control unit controls the solenoid valve units based on supply of an instruction signal, which instructs operation of the solenoid valve units; and
    the supply state determining unit determines whether or not an instruction content of the instruction signal and the supply state of the fluid are consistent.

12. The solenoid valve system according to claim 11, wherein:
    the supply state determining unit is provided in the control unit, or is provided in an external control device capable of supplying the instruction signal; and
    the instruction signal is supplied from the external control device to the control unit, or the instruction signal is supplied from the supply state determining unit to the control unit.

13. The solenoid valve system according to claim 12, wherein, in the case that the supply state detecting unit is the pressure switch, the supply state determining unit determines that the solenoid valve units are operating abnormally when the output signal is not supplied from the pressure switch to the supply state determining unit even though a predetermined threshold time period has elapsed from supply of the instruction signal.

14. The solenoid valve system according to claim 13, wherein the threshold time period is an adjustable time, which is longer than a time period required from supply of the instruction signal until supply of the output signal to the supply state determining unit in the case that the solenoid valve units are operating normally.

* * * * *